May 1, 1928.

G. GEISER ET AL

PIPE CLAMP

Filed Oct. 3, 1924

1,668,499

Peter Latsch
and
George Geiser
INVENTORS

BY Victor J. Evans
ATTORNEY

Patented May 1, 1928.

1,668,499

UNITED STATES PATENT OFFICE.

GEORGE GEISER AND PETER LATSCH, OF HELENA, MONTANA.

PIPE CLAMP.

Application filed October 3, 1924. Serial No. 741,474.

This invention relates to new and useful improvements in pipe clamps and more particularly to a clamp of this character especially adapted for use in stopping leaks in pipes and the main object of our invention is the provision of a pipe clamp which can be quickly and readily attached to a pipe for closing a leakage therein.

Another object of our invention is the provision of a pipe clamp adapted to be applied to a pipe for closing an opening or prevent leakage from the pipe, which is so constructed and arranged that it may be quickly and readily clamped into position upon the pipe or removed therefrom.

Figure 1:
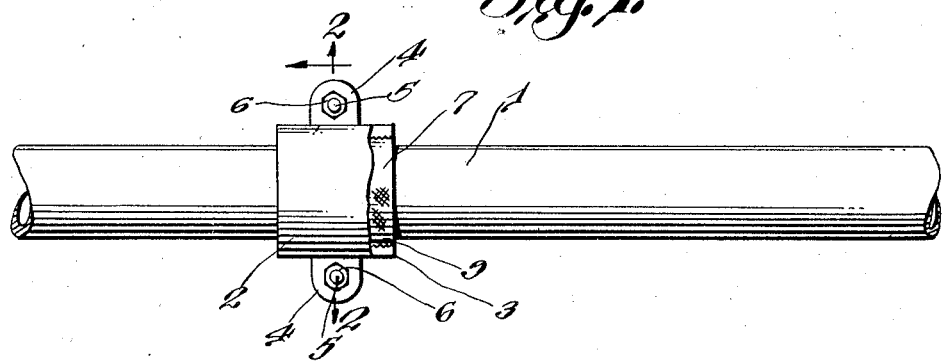
Figure 2:
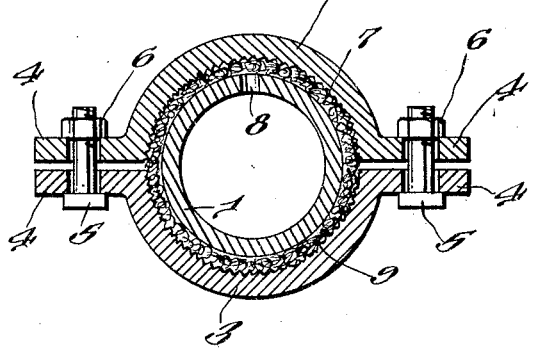
Figure 3:
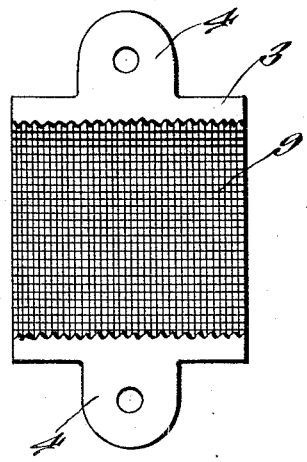
Figure 4:
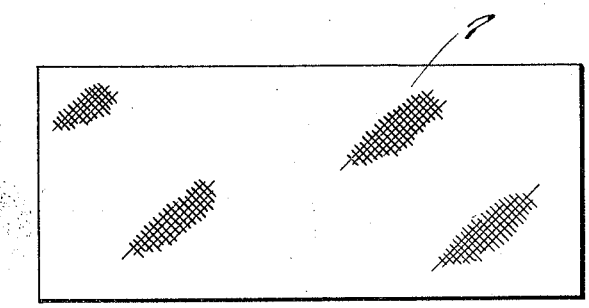

With the above and other objects in view, the invention consists in the novel features of construction, the combination and arrangement of parts hereinafter more fully set forth, pointed out in the claim and shown in the accompanying drawings, in which:

Fig. 1 is a plan view illustrating our improved clamp attached to a pipe, parts of the same broken away, Fig. 2 is a transverse section view on the line 2—2 of Fig. 1, Fig. 3 is an interior view of one of the clamping sections and Fig. 4 is a plan view of the packing strip.

Referring now more particularly to the drawings, it will be noted that our improved clamp is applied to a pipe 1 and is especially adapted for stopping leakage openings in various types of pipes.

The clamp itself comprises two substantially semicylindrical sections 2 and 3, each having a perforated ear 4 at each end of the section so that when the two sections are applied to the surface of the pipe 1 the ears 4 will be positioned relative to each other whereby the openings therethrough will be substantial registration. In order to clamp the sections 2 and 3 on a pipe suitable bolts 5 are passed through the openings in the ears 4 and nuts 6 are adjusted on the bolts in order to bring the clamping sections into tight clamping engagement with the peripheral surface of the pipe.

In order to provide for the stoppage of leaks of any size it is advisable to place a packing strip around the pipe where the break or leakage occurs before clamping the sections 2 and 3 thereon, thus, when the two sections 2 and 3 are brought together by means of the adjustment of the nuts 6 on the bolts 5 the packing 7 will be brought into tight engagement with the outer surface of the pipe around the opening or brake 8 therein so as to provide for thorough stoppage of any leaking through this opening.

It is preferred to have the interior surface of the sections 2 and 3 knurled, Fig. 3, to provide a plurality of closely disposed penetrating points 9 which serve to effectively press the packing strip 7 against the surface of the pipe 1 when the clamp is in assembled position as illustrated in Fig. 2. By the provision of the closely disposed penetrating points 9 the packing strip 7 is uniformly pressed against the surface of the pipe 1 and prevents water, leaking through a ruptured portion of the pipe, from providing water pockets which in time will rot or deteriorate the strength of the packing strip.

It will be apparent from the foregoing that we have provided a comparatively simple and inexpensive pipe clamp for stopping leaks, especially in pipes of hard material which are used as steam, gas or electric pipes and wherein the clamping of the sections to the periphery of the pipe is equal throughout due to the fact that the clamping bolts 5 may be equally tightened upon each side of the pipe.

While we have shown and described the preferred embodiment of our invention, it will be understood that various changes and alterations may be made without departing from the spirit of the invention or the scope of the appended claim.

Having thus described our invention, what we claim is:

A pipe clamp including opposed semicylindrical sections each having packing engaging surfaces knurled to provide a plurality of closely disposed penetrating points, means for detachably connecting the sections in clamping relation with respect to a pipe, and a packing member adapted to be arranged between the pipe and the sections and to be uniformly pressed over its entire surface and into covering position with respect to the pipe by said penetrating points.

In testimony whereof we affix our signatures.

PETER LATSCH.
GEORGE GEISER.